Patented Feb. 20, 1934

1,948,281

UNITED STATES PATENT OFFICE 1,948,281

PROCESS FOR DECOLORIZING ESTERS

Franklin D. Smith, Kirkwood, Mo., assignor, by mesne assignments, to Monsanto Chemical Company, a corporation of Delaware No Drawing. Application July 30, 1932
Serial No. 627,136

3 Claims. (Cl. 260—103)

This invention relates to the manufacture of carboxylic acid esters and it has particular application to the purification and refining of aliphatic esters of carboxylic acids.

When phthalic anhydride is esterified with aliphatic alcohols such as ethyl alcohol, butyl alcohol, etc., it is customary to heat the phthalic anhydride with an excess of the alcohol in the presence of an esterification catalyst. The mixture is maintained at the boiling temperature whereby the water which is formed in the course of the esterification may be removed from the reaction zone. The water is then separated in a suitable manner from the alcohol after which the alcohol is returned to the reaction zone. After the reaction is completed the excess alcohol is recovered as by distillation and the ester is washed with an aqueous solution of soda ash and thereafter with water.

The product so obtained is practically colorless, nevertheless it has a characteristic yellow cast which cannot be eliminated by ordinary means. Distillation is effective. However, in the case of high boiling esters such as diethyl phthalate this procedure is unsatisfactory since it induces decomposition.

The cast appears to be characteristic of esters of acids which have been produced by a catalytic oxidation of a hydrocarbon such as phthalic acid, maleic acid, benzoic acid, fumaric acid, etc.

I have now discovered that it is possible to eliminate the cast completely, and thereby produce a colorless, clear ester product if the ester is exposed to light. For this purpose ordinary sunlight is effective although the time required is substantially longer than in the case of a more intense light such as a carbon arc, mercury vapor light, or quartz light. The time required for effecting the treatment varies according to the intensity of the light, the depth of the ester through which the light must pass, the light transmitting quality of the intervening media, etc. The following examples will serve to illustrate embodiments of the present invention:

Example 1.—Dibutyl phthalate, which has not been distilled and which has the cast characteristic of esters of acids which have been made by the catalytic air oxidation of hydrocarbons, can be bleached or decolorized when exposed to diffused summer sunlight for three or four days. For this purpose the ester is deposited in a pyrex glass flask of approximately 10 centimeters diameter.

Example 2.—Dibutyl phthalate placed in pyrex tubes of approximately 15 millimeters diameter are disposed about 12"—15" from a carbon arc of approximately 13 ampere, 220 volt capacity, the temperature of the ester being maintained only a few degrees above the normal temperature. After 15 minutes the ester will have become distinctly improved and in the course of a half or three-quarters of an hour it becomes practically colorless.

Example 3.—That the cast is not attributable to a specific refining process to which the phthalic anhydride has been subjected is illustrated by the fact that samples of dibutyl phthalate made from phthalic anhydride manufactured by various producers of phthalic anhydride all showed the characteristic cast and all responded to the same treatment as set forth in Example 2.

Example 4.—A sample of the ethyl glycollate ester of ethyl phthalate having the probable structural formula:

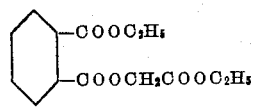

made from sodium ethyl phthalate and ethyl chloracetate may be treated in the manner described in Example 2. Exposure to a carbon arc for thirty minutes effects a complete removal of the yellow cast.

Example 5.—Butyl benzoate which has not been distilled and which has been made from benzoic acid obtained by the catalytic air oxidation of hydrocarbons is treated as in Example 2. An improvement as in Example 2 will be noted.

In lieu of the butyl esters other aliphatic alcohol esters may be treated in the manner described hereinabove. These include esters of methyl, ethyl, propyl, amyl, methoxyl ethyl, ethoxy ethyl, et al. alcohols. Similarly, acids other than benzoic and phthalic coming within this general class include maleic acid, fumaric acid, succinic acid, etc.

Although I have set forth several specific embodiments of the invention and have indicated various other modifications, it is to be understood that the invention is not limited to any particular source of light or particular means or manner of exposing the ester to the light but rather contemplates broadly the exposure of undistilled esters to the action of light.

What I claim is:

1. The method of refining liquid alkyl esters derived from acids produced by the catalytic air oxidation of aromatic hydrocarbons whereby distillation of the ester is rendered unnecessary and the color and cast of the ester is improved, which comprises exposing said ester to the action of ultraviolet light.

2. The method as defined in claim 1 and further characterized in that the ester is an alkyl ester of phthalic acid.

3. The method as defined in claim 1 and further characterized in that the light is a mercury vapor light.

FRANKLIN D. SMITH.